United States Patent
Baumann et al.

(10) Patent No.: US 6,800,354 B2
(45) Date of Patent: Oct. 5, 2004

(54) SUBSTRATES WITH A SELF-CLEANING SURFACE, A PROCESS FOR THEIR PRODUCTION AND THEIR USE

(75) Inventors: Martin Baumann, Bad Vilbel (DE); Klaus-Dieter Fritsche, Colditz (DE); Dagmar Korbelarz, Hanau (DE); Stephan Ludwig, Neuberg (DE); Lutz Poth, Rossdorf (DE)

(73) Assignee: Ferro GmbH, Frankfurt (DE)

( * ) Notice: Subject to any disclaimer, the term of this patent is extended or adjusted under 35 U.S.C. 154(b) by 0 days.

(21) Appl. No.: 10/021,558

(22) Filed: Dec. 12, 2001

(65) Prior Publication Data

US 2002/0142150 A1 Oct. 3, 2002

(30) Foreign Application Priority Data

Dec. 21, 2000 (DE) .......................... 100 63 739

(51) Int. Cl.$^7$ .......................... B32B 5/16; B32B 17/06; B32B 27/06
(52) U.S. Cl. .................. 428/141; 428/142; 428/143; 428/144; 428/323; 428/402; 428/411.1; 428/426
(58) Field of Search .................. 428/141, 142–143, 428/144, 150, 145, 146, 147, 148, 149, 402, 323, 325, 328, 329, 330, 331, 411.1, 426; 524/430, 497; 427/212, 256, 215, 216, 331

(56) References Cited

U.S. PATENT DOCUMENTS

| | | | |
|---|---|---|---|
| 3,354,022 A | 11/1967 | Dettre et al. | |
| 3,931,428 A | 1/1976 | Reick | |
| 3,951,633 A | 4/1976 | Danihel | |
| 3,958,073 A | 5/1976 | Trevisan et al. | |
| 3,998,643 A | 12/1976 | Liddle | |
| 4,377,608 A | 3/1983 | Daudt et al. | |
| 4,387,195 A | 6/1983 | Tully et al. | |
| 4,410,563 A | 10/1983 | Richter et al. | |
| 4,482,656 A | 11/1984 | Nguyen et al. | |
| 4,687,707 A | 8/1987 | Matsuo et al. | |
| 5,240,774 A | 8/1993 | Ogawa et al. | |
| 5,324,566 A | 6/1994 | Ogawa et al. | |
| 5,424,130 A | 6/1995 | Nakanishi et al. | |
| 5,437,894 A | 8/1995 | Ogawa et al. | |
| 5,466,486 A | 11/1995 | Ogawa et al. | |
| 5,478,651 A | 12/1995 | Tannenbaum | |
| 5,599,489 A | 2/1997 | Saiki et al. | |
| 5,674,625 A | 10/1997 | Takahashi et al. | |
| 5,800,918 A | 9/1998 | Chartier et al. | |
| 6,048,910 A | 4/2000 | Furuya et al. | |
| 6,068,911 A | * 5/2000 | Shouji et al. | ............. 428/143 |
| 6,156,409 A | 12/2000 | Doushita et al. | |
| 6,235,383 B1 | 5/2001 | Hong et al. | |
| 6,403,213 B1 | 6/2002 | Huesmann | |
| 6,447,919 B1 | 9/2002 | Brown et al. | |
| 6,461,670 B2 | 10/2002 | Akamatsu et al. | |
| 6,471,761 B2 | 10/2002 | Fan et al. | |
| 6,485,838 B1 | 11/2002 | Shimada et al. | |
| 6,511,753 B1 | 1/2003 | Teranishi et al. | |
| 6,649,266 B1 | 11/2003 | Gross et al. | |
| 2002/0150725 A1 | 10/2002 | Nun et al. | |
| 2002/0164443 A1 | 11/2002 | Olese et al. | |

FOREIGN PATENT DOCUMENTS

| | | |
|---|---|---|
| DE | 19941753.9 | 9/1999 |
| DE | 19945513.9 | 9/1999 |
| DE | 19946280.1 | 9/1999 |
| DE | 10018223 A1 | 4/2001 |
| DE | 10059487 A1 | 6/2002 |
| EP | 0684075 A1 | 11/1995 |
| EP | PCT/EP95/02934 | 2/1996 |
| EP | 0748775 A2 | 12/1996 |
| EP | 0909717 A1 | 4/1999 |
| EP | 0 909 747 * | 4/1999 |
| EP | 0933388 A2 | 8/1999 |
| EP | 1075867 A1 | 2/2001 |
| EP | PCT/EP01/02790 | 10/2001 |
| WO | WO-963/04123 A1 | 2/1996 |
| WO | WO 01/17694 A3 | 3/2001 |
| WO | WO 01/17694 A2 | 3/2001 |
| WO | WO 01/40394 A2 | 6/2001 |
| WO | WO 01/40394 A3 | 6/2001 |
| WO | WO-01/74739 A1 | 10/2001 |
| WO | WO-02/49980 A1 | 6/2002 |
| WO | WO-02/064266 A2 | 8/2002 |
| WO | WO-03/013827 A1 | 2/2003 |

OTHER PUBLICATIONS esp Abstract for EP0933388 published Aug. 4, 1999.
esp Abstract for EP0909747 published Apr. 21, 1999.

* cited by examiner

*Primary Examiner*—Ramsey Zacharia
(74) *Attorney, Agent, or Firm*—Rankin, Hill, Porter & Clark LLP

(57) ABSTRACT

A substrate of glass, ceramic, plastic and metal, or a glazed or enamelled substrate, with a self-cleaning and/or hydrophobic surface. The substrate having disposed thereon a coating that includes a plurality of particles affixed to the surface of the substrate by a binder. The particles are preferably of nanoscale size and extend outwardly from a surface of the coating to form a nano-rough surface. The nano-rough surface causes a hydrophobic or water repellent effect. The binder can be formed from an organic or an inorganic material and operates to fix the plurality of particles to substrate surface.

4 Claims, No Drawings

SUBSTRATES WITH A SELF-CLEANING SURFACE, A PROCESS FOR THEIR PRODUCTION AND THEIR USE

REFERENCE TO RELATED APPLICATIONS

This application Application DE 100 63739.6 filed Dec. 21, 2000.

1. Technical Field

The invention relates to a substrate with at least one self-cleaning surface, the substrate is preferably a glass, ceramic, plastic or metal substrate, or a glazed or enamelled coated substrate. The self-cleaning surface located on the substrate is based on a coating located on the substrate, the coating forming a structure, and the surface structure configured to have elevations and depressions. Further, the surface is at least partly hydrophobic. The invention also relates to a composition for the production of a substrate with at least one self-cleaning surface, and to a process for the production of the same. The process includes coating the substrate with the abovementioned composition or coating. The invention also relates to various uses of a substrate having a self-cleaning surface.

2. Description of Related Art

To achieve both a good self-cleaning effect on a surface having a good level of hydrophobicity there must be a micro rough surface structure on the surface of a substrate. Both features (micro rough and hydrophobicity) are realized in nature, for example, in the lotus leaf. The surface of the lotus leaf has a hydrophobic material and pyramid shaped elevations that are a few $\mu$m from one pyramid tip to another pyramid tip. Drops of water substantially contact only with the tips or peaks of the pyramids so that the contact area of water to surface is minuscule relative to the water drops contacting a micro smooth surface. The reduced surface area results in a very low adhesion between the water drops and the micro rough surface. The relationship of micro rough surfaces and hydrophobicity, and the applicability of the "lotus effect" on surfaces, is taught by A. A. Abramzon, Khimia i Zhizu (1982), no. 11, 38 40.

Without reference to the LOTUS EFFECT®, U.S. Pat. No. 3,354,022 discloses water repellent surfaces having a micro rough structure with elevations and depressions and a hydrophobic material. In particular, a fluorine containing polymer is disclosed as the hydrophobic material. According to one embodiment, a surface with a self-cleaning effect can be applied to ceramic brick or glass by coating the substrate with a suspension comprising glass beads and a fluorocarbon wax. The beads have a diameter in the range from 3 to 12 $\mu$m. The fluorocarbon wax is a fluoroalkyl ethoxymethacrylate polymer. Unfortunately, such coatings have a disadvantageously low abrasion resistance and only a moderate self-cleaning effect.

European Patent No. EP 0 909 747 A1 discloses a process for producing a self-cleaning property of a surface. The method relates particularly to the surface of roof tiles. The surface has hydrophobic elevations having a height of 5 to 200 $\mu$m. Such a surface is produced by application of a dispersion of powder particles of an inert material in a siloxane solution, and subsequent curing the siloxane solution to form a polysiloxane. Unfortunately, the structure forming particles are not well fixed to the surface of the substrate in an abrasion stable manner and thus the abrasion resistance is undesirably low.

European Patent No. EP 0 772 514 discloses a self-cleaning surface for objects with a synthetic surface structure having elevations and depressions. The distance between the elevations is in the range of from 5 to 200 $\mu$m, and the height of the elevations is in the range from 5 to 100 $\mu$m. The structure includes hydrophobic polymers, or materials that have been hydrophobized in a stable manner. Etching, embossing, and coating processes are suitable to form the structure. If necessary, the formation of the structure can be followed by a hydrophobization step, for example a silanization process.

Structured surfaces with hydrophobic properties are disclosed in European Patent No. EP 0 933 388 A2. The surfaces have elevations with an average height of 50 nm to 10 $\mu$m and an average separation of between 50 nanometers (nm) to 10 micrometers ($\mu$m), and a surface energy of the non structured material of 10 to 20 micronewtons per meter (mN/m). To achieve a particularly low surface energy, and thus hydrophobic and oleophobic properties, the structured surface includes fluorine containing polymers or has been treated using alkylfluorosilanes.

German (DE) Patent Application 100 16 485.4 discloses glass, ceramic and metal substrates having a self-cleaning surface. The surface has a structured and at least partly hydrophobized coating. The coating includes a glass flux and structure forming particles with an average particle diameter in the range from 0.1 micrometers ($\mu$m) to 50 micrometers ($\mu$m). The glass flux and structure forming particles are present in a volume ratio in the range from 0.1 to 5. The micro rough surface structure has a ratio of average profile height to average distance between adjacent profile peaks in the range from 0.3 to 10. The self-cleaning surface has a higher abrasion resistance relative to the self-cleaning surfaces of roof tiles disclosed hereinabove.

SUMMARY OF THE INVENTION

The present invention provides a substrate, and preferably a glass, ceramic, plastic, metal and/or glazed or enamelled substrate, with a self-cleaning surface. The self-cleaning surface preferably has a low roll off angle or high contact angle (and therefore a good self-cleaning effect), and is also transparent. The self-cleaning surface preferably has a very high contact angle with respect to water, preferably a contact angle of about/above 150°.

Subjecting the substrate to a hydrophobating process according to the present invention preferably does not reduce the transparency of a transparent substrate, such as glass or plastic. Additionally, a decorated surface subjected to a hydrophobating process according to the present invention, where the decoration is under the self-cleaning surface, is preferably clearly detectable by an observer of the surface. Glass, ceramic, and metal substrates, or glazed or enamelled substrates, preferably have a higher abrasion resistance relative to known hydrophobic substrates, in particular with reference to a structured surface that is made of an organic polymer, or that includes structure-forming particles bonded using an organic polymeric material. Additionally, the substrates with the self-cleaning surface according to the invention are preferably formed using a simple process. A preferred process is similar to processes used in the glass and ceramics industry or metal processing industry for decorating surfaces. These and further objects such as are deduced from the further description do not have to be achieved together in all the embodiments.

DETAILED DESCRIPTION OF PREFERRED EMBODIMENTS

The present invention provides a self-cleaning or hydrophobic coated substrate. The substrate is preferably glass, ceramic, plastic or metal, or is a glazed or enamelled coated substrate, and has a self-cleaning or hydrophobic coating arranged thereon. The coating includes particles that form a surface structure on the coating opposite the coating side that contacts the substrate. The coating is at least partly superficially hydrophobic. The structure forming particles preferably have an average diameter of less than 100 nanometers (nm).

Substrates according to the invention, having a "nanoscale" structured surface and a superficially hydrophobic coating thereon, have an outstanding self-cleaning effect when the structure-forming particles have an average diameter of less than 100 nanometers (nm). A preferred particle diameter is preferably in the range from 5 nm to 50 nm.

The term "average diameter" as used herein is the diameter of primary particles, and is not the diameter of agglomerates. In general, at least 90% and preferably about 100% of the primary particles have a diameter of less than 100 nm and particularly preferably less than 50 nm. The term "nanoscale" means that the structure has considerably lower profile heights and distances between profile peaks than surfaces with structure forming particles in the micrometer range (i.e., "microscale").

The structure forming particles can be either organic or inorganic substances. Examples of suitable inorganic structure forming particles are: metal oxides, mixed oxides, silicates, sulfates, phosphates, borates, metal sulfides, oxosulfides, selenides and sulfoselenides, metal nitrides and oxide nitrides and metal powders. Examples of suitable organic structure forming particles are: carbon blacks, nanoscale organic polymeric particles, and nanoscale organic polymeric particles containing fluorine. Structure forming particles having a particle diameter according to the invention are commercially available, otherwise the particles can be obtained by precipitation processes which are known, for example, by pyrogenic processes, and by gaseous starting substances that are converted into pulverulent substances.

The structure forming particles are preferably metal oxides selected from the series consisting of silica ($SiO_2$), titanium dioxide ($TiO_2$), aluminium oxide ($Al_2O_3$), zirconium dioxide ($ZrO_2$) and tin dioxide ($SnO_2$). These oxides are preferably pyrogenically prepared oxides, and among these silica is most preferred. Pyrogenic silica with an average primary particle size in the range from about 7 nm to 40 nm is commercially available.

As disclosed hereinabove, the self-cleaning substrate surface according to the invention includes a coating or layer forming material. And, the coating can be an inorganic or organic material. The coating can be a homogeneous layer over the structure forming particles where the primary particles and/or agglomerates are fixed to the substrate surface, or the particles are incorporated into the coating, which affixes the particles to the substrate surface (that is, the coating is the particles' binder). Some of the primary particles and/or agglomerates thereof project at least partly out of the coating surface to form elevations and depressions, which, in addition to the hydrophobization coating, are responsible for the self-cleaning effect according to the invention.

A preferred coating includes an inorganic material, preferably a vitreous inorganic material. The coating is formed by a ceramic firing process performed on one or more glass frits or glass forming raw materials. That is, glass frit is used that has a melt point that is lower relative to the substrate and the structure forming particles. That is, the glass frit has a melting point below that of the structure forming particles and below the deformation temperature of the substrate to be coated.

During the firing, the temperature is increased to above the melt point of the glass frit, but below the melt point of the substrate and the structure forming particles. The vitreous material melts and flows to enclose the structure forming particles and affix the particles to the surface of the substrate. Some of the particles project away from the surface out of the molten glass frit. The glass frit cools to harden and bind the structure forming particles to the substrate surface.

Rather than glass frit, alternatively the vitreous material is a glass-forming material that forms vitreous bonds with constituents of the substrate and/or some of the structure forming particles during a firing process. In particular, low melting oxidic or sufficiently reactive raw materials can be so used. The vitreous bonds are structural elements of the general formula Me—O—Me', wherein Me and Me' are generally metals and can be identical or different from each other. Me and Me' are selected from the group consisting of boron, silicon, phosphorus, aluminium, titanium, tin, zirconium and other metals suitable as a substrate.

An example of a material which contains Me—O—Me' structural elements and in which the structure forming particles are embedded is a system obtained during a firing of a coating glass or a vitreous or enamelled substrate with a composition comprising boric acid and/or an alkali metal phosphate and structure forming particles. The boric acid and/or the phosphate form a chemical bond to reactive groups of the glass substrate or the glazing/enamel layer and may also bond with the structure forming particles during the firing.

Alternatively, coating materials with Me—O—Me' structural elements include systems formed from organometallic compounds of the elements boron, silicon, aluminium, titanium and zirconium, where the system has at least two hydrolysable groups available for alcoholysis/hydrolysis with a subsequent condensation reaction, and an optional subsequent firing.

In another embodiment, a coating having a surface structure according to the invention includes structure forming particles with an average diameter of less than 100 nm, and preferably in the range from about 5 nm to less than about 50 nm, and a layer forming inorganic or organic material in a weight ratio in the range from 100:1 to 1:2, in particular 20:1 to 1:1. While a ratio outside the above parameters is possible, it is believed that the content of layer forming material would be too low, and would possibly be inadequate to affix the structure forming particles to the substrate. If there is too much layer forming material, it is believed that the self-cleaning effect would decrease because the structure forming particles would be sunk too low in the layer forming material, and would not protrude sufficiently to create the desired elevations and depressions.

A preferred substrate has a coating that includes structure forming particles and a coating formed of a layer forming inorganic material. The coating can further include adhesion promoters or compounds formed from auxiliary substances present and/or precursors of the layer forming material during the production of the coating. The coating production process can include a heat treatment step, which may be necessary for firing.

In order to impart to the structured surface the necessary hydrophobic properties, and thus create the desired high contact angle and/or low roll off angle, a hydrophobic layer is disposed on the structured substrate surface or layer. For example, a suitable hydrophobic layer can be obtained by silanization. In particular, a desirable contact angle is above about 150°, and a desirable low roll off angle is below about 1°. The phrase "self-cleaning" is generally synonymous with a contact angle or a low roll off angle in the above-described preferred range.

In another embodiment according to the invention, a microscale over structure forming a micro rough surface is formed on a substrate surface. A nanoscale rough surface is then formed onto the microscale over structure, and the surface is then hydrophobized. The over structure forms elevations and depressions in a regular or stochastic (random) distribution over the self-cleaning surface of the substrate. "Micro rough" is preferably a height of the profile peaks in a range from 0.1 micrometers ($\mu$m) to 50 $\mu$m and a distance between the profile peaks in a range from 0.1 micrometers ($\mu$m) to 50 $\mu$m, and preferably a height and distance in a range of 0.5 $\mu$m to 15 $\mu$m.

Substrates according to the invention having a nanoscale structure over a microscale structure can have either one or two structure forming coatings on the substrate. In a single coating, the nanoscale and microscale particles are distributed in the same coating. In a two coating system, there is a first coating with microscale particles that is applied to the substrate, and subsequently a second coating with nanoscale particles is applied to the substrate having the microscale particles already affixed thereto.

With further reference to the hydrophobic coating according to the invention, the coating itself may not have inherent hydrophobic properties, for example when the coating is used as a binder for the structure forming particles rather than a hydrophobic overcoat. If the coating is not inherently hydrophobic, the hydrophobicity is effected by applying a hydrophobizing substance to the structured surface. Suitable hydrophobizing substances include organosilanes, and in particular fluorine containing organosilanes. If the coating, acting as a binder, is a vitreous material, then using organosilanes having a hydrophobizing action can form Si—O—Si structural elements. As a result, the hydrophobizing substance is fixed firmly to the structured substrate via the Si—O—Si bonds to form a permanent self-cleaning property.

The present invention relates to compositions suitable to for use in forming self-cleaning surfaces, and to processes for the production of substrates having self-cleaning surfaces using the compositions.

The compositions for the production of a self-cleaning substrate surface according to the invention are preferably mixtures that include: structure forming particles and a coating or layer material. The particles preferably have an average particle diameter of less than 100 nm, and more preferably the particles have an average particle diameter in the range from 5 nm to less than 50 nm. As mentioned above, the particle diameter is that of the primary particles and the diameter of at least 90%, and preferably substantially all of the particles, is preferably less than 100 nm, and more preferably less than 50 nm.

The coating, before application, can be in a particulate or liquid form. The coating or layer forming material can be an organic or inorganic material. The term "layer forming material" is a material that, in the context of application to the substrate by either a physical or a chemical route, is capable of forming a generally homogeneous layer and of fixing the structure forming particles in the layer or/and onto the substrate.

If the layer forming material is an organic polymeric material, or polymeric precursors, it is preferably in the form of a solution of an organic or aqueous solvent or solvent mixture or in the form of an organic or aqueous suspension. The applied coating or homogeneous layer is achieved by evaporation of the solvent, and then, during a subsequent heat treatment, by the fusing together of thermoplastic particles or by a condensation reaction, polycondensation reaction, or polyaddition reaction.

If the layer forming material is an inorganic material, suitable layer forming inorganic materials include glass frits and oxidic raw materials (that is, glass precursors) which are capable of glass formation with other substances, such as, for example, boric acid ($B_2O_3$), bismuth oxide ($Bi_2O_3$), alkali metal and alkaline earth metal oxides, zinc oxide and lead oxide as well as alkali metal silicates, and phosphates and borates. Most of the glass forming substances in the composition are in particulate form. Alkali metal oxides and alkali metal silicates in the composition are in the form of an aqueous alkali solution, or are in the form of water glass (sodium silicate solution).

Alternatively, the layer forming material includes an organometallic compound of one or more of the elements boron, silicon, aluminium, titanium and zirconium as the layer forming material. The organometallic compound preferably contains alkoxy groups, acetyl groups or acetylacetonate group, so that Me—O—Me' structural elements are formed by a condensation reaction. The Me and Me' can be the same or different from each other and represent the elements mentioned. If a pulverulent composition is used, the pulverulent compositions can be applied to the substrate by dusting or by electrostatic coating.

The composition that preferably includes the structure forming particles and the coating or layer forming material in a weight ratio of about 100:1 to about 1:2. Preferably, the weight ratio is in a range of from about 20:1 to about 1:1.

In addition to the layer forming materials and the structure forming particles, the composition according to the invention can also include a liquid medium. The consistency a composition that includes a liquid medium can be in a wide range of viscosities. For example, if the composition is applied by spraying or dipping, a considerably lower viscosity is established. But, if a conventional printing process is used to apply the composition a relatively higher viscosity can be used. For example, if a printing process, for example a screen-printing process, is used, the consistency of the composition is preferably paste-like.

The liquid medium can be an organic or organic aqueous or aqueous medium, which can comprise processing auxiliaries, such as agents to adjust the viscosity, in addition to obligatory components.

A particularly preferred composition suitable for the formation of a structured surface of a glass, ceramic or metal substrate, or a glazed or enamelled substrate include (as the layer forming material) one or more glass frits as the main component. The softening point of the glass frits being sufficiently below the deformation temperature of the substrate. If the composition preferably further includes a raw material capable of glass formation (that is, a glass precursor). The raw material is selected based on the ability of the raw material to undergo chemical bonding under conventional firing conditions with itself, with structural elements of the substrate, and/or with structural elements of the nanoscale particles. For example, boric acid and alkali metal phosphates are particularly suitable layer forming materials or precursors thereof.

A preferred method according to the invention of firmly adhering to a glass structured surface includes using a liquid composition, or a paste-like composition, that includes boric acid or an alkali metal dihydrogen phosphate as the layer forming material, or a precursor thereof, and a pyrogenic oxide as the structure forming material. Subsequent to the formation of the structured surface, the surface is hydrophobized with an organosilane, preferably a fluorine containing organosilanes. The method results in a surface having particularly good self-cleaning properties. That is, the contact angle of a glass coated by this method is above 150°.

With further reference to the coating or layer forming material, the surface of the micro rough layer is at least partly hydrophobized, and preferably at least the peaks and elevations are hydrophobized. Preferably, however, the entire surface is hydrophobized. The hydrophobization includes the application of a very thin coating, which adheres firmly to the underlying surface. The thin coating has, for example, of a thickness of 1 nm to 10 nm. The adhesion is preferably caused by the coating composition's film formation after application. Preferred hydrophobizing agents chemically bond to the substrate to form, for example, an Si—O—Si bridge. Such bridges result from the reaction of a silanol group of a silicatic material of the structured coating with an alkoxysilane or alkoxysiloxane. An exemplary preferred substrate with a self-cleaning surface according to the invention has a coating only a few atom layers thick. The coating is based on an alkyltrialkoxysilane, and preferably a longer chain fluoroalkyltrialkoxysilane, or an oligomer thereof.

The substrates according to the invention with a self-cleaning surface can be produced by a process that includes the following steps:

1. coating of a surface of the substrate with a composition, the composition including structure forming particles and an inorganic or organic layer forming material, the composition is pulverulent or, preferably, has a liquid to paste-like consistency, 2. forming a cohesive layer that fixes the structure forming particles and adheres the structure forming particles firmly to the substrate to form a structured surface; and 3. hydrophobizing the structured surface with a hydrophobizing agent, preferably an organosilane, which adheres firmly to the structured surface, or forms a chemical bond thereto.

A particular feature of the process is the use of structure forming nanoscale particles with an average diameter of less than 100 nm, preferably less than 50 nm, but at least 5 nm. The profile heights of the elevations are less than 100 nm, and preferably less than 50 nm. If microscale particles in the $\mu$m range that form an over structure are present, then the nanoscale particles are arranged on the microscale particles.

A conventional coating process type composition includes the structure forming particles and the layer forming material and is applied by conventional coating processes. A pulverulent coating type composition is applied to the substrate surface by dusting the substrate or by electrostatic coating. A printing coating type composition preferably has a liquid to paste-like composition and is preferably applied to the substrate surface by spraying, brushing, pouring, dipping or by another conventional printing process, such as a screen printing or a dabber transfer printing process.

The "formation of a cohesive layer which adheres firmly to the substrate and fixes the structure forming particles" can vary based on the substrate to be coated and by the coating composition and type. A cohesive layer can be produced by passing a coated substrate to a heat treatment if the composition includes an organic polymeric material that is either pulverulent or suspended in a liquid medium. The solvent, if present, evaporates, and polymer particles fuse together. Or, in the case of multi component systems, precursors react to form a polymeric material that binds the structure forming particles to the substrate surface.

Some compositions according to the invention can be converted into a cohesive structured layer by a heat treatment or a firing process. The proviso is that the substrate must be able to withstand the heat treatment or firing process. Suitable substrates include glass, ceramic, or metal substrates or glazed or enamelled substrates. The compositions that can so convert include glass frit or constituents that are capable of glass formation with the substrate surface and/or the particles.

During the firing process, the glass frit melts to form a homogeneous molten layer. The composition that is capable of glass formation, undergoes a chemical reaction with reactive groups of the substrate and/or the structure forming particles to form a vitreous structure having structural elements of the formula Me—O—Me'. The glass frits and/or constituents capable of glass formation contained in the composition are selected such that the heat treatment is performed at a temperature below the deformation temperature of the substrate. In the coating of glass, the composition will accordingly comprise those layer-forming constituents that melt below about 650° C., and preferably melt in the range of from about 450 to about 600° C., and can form the required structures.

A nanostructured coating according to the invention can have a varying layer thickness. Preferably, the layer thickness is in the range of from about 5 nm to 1000 nm. If the coating additionally includes the larger particles (to form the microscale overstructure), the maximum height of the layer higher. Alternatively, a substrate already coated with a composition that forms a micro rough surface structure, preferably includes a coating using only nanoscale particles having a particle diameter of less than 100 nm, preferably less than 50 nm. After the nanoscale coating is applied the substrate can be baked and hydrophobized.

After the formation of the structured surface, the hydrophobization stage follows:

The hydrophobization can be carried out by application of a hydrophobic lacquer or by polymerization of monomers on the micro rough surface. Suitable polymeric lacquers are solutions or dispersions of e.g. polyvinylidene fluoride. A hydrophobization can also be carried out by plasma polymerization of completely or partly fluorinated vinyl compounds.

The hydrophobization is carried out using reactive alkyl or, preferably, fluoroalkylsilanes and oligomeric alkyl or fluoroalkylsiloxanes. The silanes or siloxanes preferably contain one or more alkoxy or acetyl groups, such as ethoxy groups, as the reactive group. Crosslinking of the hydrophobizing agent and also chemical bonding thereof to a silicatic surface containing silanol groups is possible by means of these functional groups. Preferable silanizing agents include tridecafluorooctyltriethoxysilane and oligomers thereof. Such products can be applied to the surface to be hydrophobized by, for example, dipping, spraying or brushing in or with a dilute organic solution, preferably an alcoholic solution, or an aqueous organic solution or an aqueous solution.

After applying a solution that includes a fluorine containing silane or siloxane to the substrate, the substrate is dried and cured. The drying and curing is preferably at a temperature of up to about 500° C. The dry or cure time is, for example, 30 to about 60 min at about 150° C., 10 to 15 min at 250 to 300° C., and about 1 minute at about 500° C. The optimum heat treatment to elicit the highest abrasion resistance is at a temperature in the range from 200 to 300° C.

Using dilute solutions of the silanes or siloxanes mentioned, layers a few nm thick that have a very high chemical and mechanical resistance and are 2 and 3 dimensional siloxane networks are obtained. The hydrophobic layers accessible using reactive fluoroalkylsilanes or -siloxanes are distinguished by a similarly good hydrophobicity and oleophobicity, so that substrates according to the invention contaminated with hydrophobic dirt particles can also easily be cleaned with water.

The invention also relates to the use of a substrate with a self-cleaning surface. Examples of such uses include glass panes for vehicles and windows, construction glass, ceramic tiles, roof tiles, covers on photovoltaic solar cells, metal profiles and lacquered substrates, such as car lacquers.

A particularly outstanding feature of substrates according to the invention is the transparency of the nanostructured coating. Transparent substrates of plastic and glass, and of glazed or enamelled substrates are suitable for use as a transparent coating and therefore useful for surfaces of substrates that are themselves transparent, or are decorated, and to thus reveal underlying decorations. Advantages of compositions according to the invention include easy accessibility and range of composition variation. The compositions are useful to coat diverse substrates and still produce good self-cleaning properties.

The stages of the process according to the invention are based closely on those process stages such as are used, for example, for decoration purposes in the glass and ceramics industry, but are also conventional in the lacquering of metallic substrates with stoving lacquers. The devices and technologies known to the expert can therefore be used.

EXAMPLES

Example 1

Production of float glass or high grade steel with a transparent self-cleaning surface.

A 4 millimeter (mm) float glass was coated with a composition according to the invention by means of a screen printing process. The composition included 0.5 wt. % boric acid ($B_2O_3$) and 4 wt. % pyrogenic silica in a screen printing medium (no. 80858, commercially available from dmc$^2$ AG (Germany)). The printing medium was a water friendly medium. The pyrogenic silica had an average diameter of the primary particles of 12 nm. The screen printing was carried out using a 100 T screen. After drying, the coating was shock fired at 660° C. in the course of 4 min. The hydrophobization of the structured stoved surface was carried out using a fluoroalkylsilane formulation, that is to say an ethanolic solution of tridecafluorooctyltriethoxysilane. The solution was introduced over the surface, and curing was then carried out at elevated temperature. The float glass coated in this way was transparent and had a contact angle of above 150°.

Example 2

Production of float glass or high grade steel with a transparent self-cleaning surface.

The method used was the same as described in EXAMPLE 1, except that the composition comprised 0.5 wt. % diammonium hydrogen phosphate (($NH_4)_2HPO_4$) instead of boric acid as the layer forming material. After the hydrophobization, the glass coating showed outstanding self-cleaning properties.

It is assumed that during firing vitreous structures with the structural element Si—O—B or Si—O—P or metal-O—P form between the boric acid or the phosphate and reactive centres of the glass or metal and the structure forming silica particles.

Example 3

Production of a metal substrate having a self-cleaning surface.

The substrate was degreased V4A high grade steel. A composition with 4 wt. % pyrogenic silica (having a diameter of 12 nm) and diammonium hydrogen phosphate in an amount of (a) 0.25 wt. %, (b) 0.5 wt. % and (c) 1.0 wt. % in screen printing medium 80858 was used for the coating. After coating by means of screen printing, firing was carried out for 6 minutes at 660° C. A scratch resistant self-cleaning surface was obtained in EXAMPLES 1–3.

What is claimed is:

1. A coated substrate, comprising: a coating disposed on a glass, ceramic, plastic or metal substrate, or disposed on a glazed or enamelled substrate, the coating comprising nanoscale structure-forming particles that form a surface structure that is at least partly hydrophobic, and the nanoscale structure-forming particles have an average diameter of less than 100 nm, and the coating further comprising an inorganic or organic layer-forming material that binds the structure-forming particles to the substrate; and the coating further comprises micro-scale structure-forming particles having an average diameter in a range of from about 0.1 micrometers to about 50 micrometers, the micro-scale structure-forming particles being contained in a same first layer as the nanoscale particles, or in an optional second layer that is disposed underneath the first layer, whereby the micro-scale structure-forming particles support the nanoscale structure-forming particles that are disposed thereon.

2. The substrate as defined in claim 1, wherein the nanoscale structure-forming particles and the layer-forming material are together present in the coating in a weight ratio in the range from 100:1 of structure-forming particles to layer-forming material to 1:2 of structure-forming particles to layer-forming material.

3. The substrate as defined in claim 1, wherein the substrate is formed of glass or plastic.

4. The substrate as defined in claim 3, wherein the substrate is glass and the coated substrate is substantially transparent.

* * * * *